(12) United States Patent
Smith et al.

(10) Patent No.: US 7,271,126 B2
(45) Date of Patent: Sep. 18, 2007

(54) CATALYST FOR THE DEHYDROGENATION OF ETHYL BENZENE TO STYRENE PREPARED WITH A HIGH PURITY IRON PRECURSOR

(75) Inventors: Dennis J. Smith, Jeffersontown, KY (US); Robert J. O'Brien, Louisville, KY (US); X. D. Hu, Louisville, KY (US)

(73) Assignee: Sud-Chemie Inc., Louisville, KY (US)

( * ) Notice: Subject to any disclaimer, the term of this patent is extended or adjusted under 35 U.S.C. 154(b) by 263 days.

(21) Appl. No.: 10/876,150

(22) Filed: Jun. 24, 2004

(65) Prior Publication Data

US 2004/0235652 A1    Nov. 25, 2004

Related U.S. Application Data

(63) Continuation-in-part of application No. PCT/US02/15310, filed on May 15, 2002.

(51) Int. Cl.
*B01J 23/00* (2006.01)
*B01J 21/00* (2006.01)
*B01J 20/00* (2006.01)

(52) U.S. Cl. .............. 502/326; 502/304; 502/306; 502/307; 502/309; 502/312; 502/314; 502/316; 502/317; 502/318; 502/319; 502/320; 502/321; 502/322; 502/323; 502/324; 502/327; 502/328; 502/329; 502/330; 502/331; 502/332; 502/333; 502/334; 502/336; 502/338; 502/339; 502/104; 502/110; 502/111; 502/113; 502/117; 502/240; 502/258

(58) Field of Classification Search ........... 502/304, 502/306, 307, 309, 312, 314, 316–323, 324, 502/326–333, 334, 336, 338, 339, 104, 110, 502/111, 113, 117, 240, 258
See application file for complete search history.

(56) References Cited

U.S. PATENT DOCUMENTS

| | | | |
|---|---|---|---|
| 3,518,208 A | | 6/1970 | Schneider et al. |
| 3,892,897 A | | 7/1975 | Rittler |
| 4,343,724 A | | 8/1982 | Antos |
| 4,414,133 A | | 11/1983 | Otake et al. |
| 4,478,954 A | | 10/1984 | Connolly et al. |
| 4,499,204 A | | 2/1985 | Vanderspurt et al. |
| 4,666,882 A | | 5/1987 | Okazaki et al. |
| 4,933,313 A | | 6/1990 | Tamaru et al. |
| 5,665,667 A | | 9/1997 | Lemanski et al. |
| 5,863,856 A | | 1/1999 | Mauldin |
| 5,935,898 A | * | 8/1999 | Trubenbach et al. ........ 502/150 |
| 5,962,757 A | * | 10/1999 | Milam et al. ............... 585/444 |
| 6,177,602 B1 | * | 1/2001 | Williams et al. ........... 585/444 |
| 6,183,658 B1 | | 2/2001 | Lesniak et al. |
| 6,191,065 B1 | * | 2/2001 | Williams et al. ........... 502/300 |
| 6,242,379 B1 | * | 6/2001 | Williams et al. ........... 502/300 |
| 6,465,704 B2 | * | 10/2002 | Williams et al. ........... 585/444 |

* cited by examiner

*Primary Examiner*—Cam N. Nguyen
(74) *Attorney, Agent, or Firm*—Joan L. Simunic

(57) ABSTRACT

A method for producing a catalyst for use in the dehydrogenation of ethylbenzene to styrene is disclosed. The catalyst of the present invention comprises a high purity metal and at least one promoter in the form of solid oxides, oxide hydrates, hydroxides, hydroxycarbonates or metals. The catalyst is prepared via a method which comprises the preparation of at least one high purity iron precursor with or without an additional support material and which uses a nominal amount of water in the catalyst production. The catalyst pellets prepared with the high purity metal precursor are essentially free of sulfur and chloride contaminants.

12 Claims, No Drawings

CATALYST FOR THE DEHYDROGENATION OF ETHYL BENZENE TO STYRENE PREPARED WITH A HIGH PURITY IRON PRECURSOR

CROSS REFERENCE TO RELATED APPLICATIONS

The present application is a continuation-in-part application to PCT patent application Ser. No. PCT/US02/15310 filed May 15, 2002, currently pending, and incorporated herein in its entirety by reference.

BACKGROUND

The present invention is a method for producing a catalyst for use in the dehydrogenation of ethylbenzene to styrene (a "STYRENE" catalyst), and for the catalyst produced by the inventive method. The catalyst of the present invention comprises a high purity metal and at least one promoter in the form of solid oxides, oxide hydrates, hydroxides, hydroxycarbonates or metals. The catalyst is prepared via a method which comprises the preparation of at least one high purity iron precursor with or without an additional support material and which uses a nominal amount of water in the catalyst production. The catalyst pellets prepared with the high purity metal precursor are essentially free of sulfur and chloride contaminants.

As taught in published U.S. patent application Ser. No. 20010020118, an effective dehydrogenation catalyst contains from about 40 wt % to about 90 wt % iron oxide calculated as $Fe_2O_3$, from about 5 wt % to about 20 wt % of an alkali metal compound calculated as an alkali metal oxide, from about 0.1 ppm to about 1,000 ppm of a source of palladium or platinum selected from the group including elemental palladium, elemental platinum, compounds containing palladium, compounds containing platinum and combinations thereof, from about 0.5 wt % to about 10.0 wt % of a molybdenum or tungsten compound calculated as $MoO_3$ or $WO_3$, and from about 4.0 wt % to about 12.0 wt % of a cerium compound, calculated as $CeO_2$, wherein all weight percents are based on the total weight of the catalyst. Additional promoters may be included with the catalyst.

The '118 application also teaches that a most preferable dehydrogenation catalyst contains from about 40 wt % to about 90 wt % iron oxide calculated as $Fe_2O_3$, about 5 wt % to about 20 wt % of an alkali metal compound, preferably potassium oxide, about 4.0 wt % to about 12 wt % of cerium oxide calculated as $CeO_2$, about 0.5 wt % to about 10.0 wt % of molybdenum or tungsten oxide calculated as $MoO_3$ or $WO_3$, preferably molybdenum oxide, about 0.2 wt % to about 10.0 wt % of calcium or magnesium oxide, preferably calcium oxide, about 10 ppm to about 1000 ppm of titanium oxide calculated as $TiO_2$, about 100 ppm to about 2000 ppm of chromium oxide calculated as $Cr_2O_3$, and about 1 ppm to about 1000 ppm of a source for palladium or platinum, preferably palladium, calculated on an elemental basis. Additional components that can be added to this catalyst include from about 0.1 wt % to about 10.0 wt % of an oxide of aluminum, silicon, manganese, copper, zinc, cadmium, vanadium, and cobalt, calculated on an elemental basis. The dehydrogenation catalysts of the '118 patent are prepared by using one or a combination of the following methods: co-precipitation, decomposition, impregnation and mechanical mixing or any other method, as would be readily appreciated by those skilled in the art. The method chosen should guarantee intimate mixing and uniform distribution of the components.

It is well established in the art that different forms of iron oxide, red, yellow, brown and black, can be used for preparation of the dehydrogenation catalyst. Likewise, it is known in the art that the iron oxides can be derived from a variety of precursor materials, both natural and synthetic, using a number of processes. Generally, iron is added to the catalyst compositions as red iron oxide, $\alpha$-$Fe_2O_3$ (hematite), or yellow iron oxide, $Fe_2O_3H_2O$ (goethite), but others can be readily utilized as would be appreciated by those skilled in the art. Particularly suited are pigment grades of the iron oxides. Ferrites may also be used, such as potassium ferrite.

Precipitated, pigmentary grade iron oxides are generally regarded as superior raw materials for STYRENE catalysts as compared to other types of iron oxides such as natural iron oxides or those prepared by thermal decomposition of ferric nitrate, ferric chloride, ferrous sulfate and the like. However, precipitated iron oxides can have a high cost, the preparation method is labor intensive, and the by-products are deleterious to the environment. Ferric or ferrous sulfate is a preferred iron source for precipitated iron oxides because of availability and economics. But, sulfur contamination can have a deleterious effect on the environment and an adverse impact on the performance of the resulting STYRENE catalyst and process. Further, the precipitation method tends to result in the formation of very viscous and gelatinous iron hydroxide or iron oxyhydrate precursor which can be very difficult to filter and wash.

A common procedure for preparing a precipitated oxide involves treating a solution of an iron salt, such as ferric nitrate, with a base, such as aqueous ammonia or sodium carbonate. The resulting iron oxyhydroxide precipitate is washed and filtered repeatedly to remove salts—ammonium nitrate or sodium nitrate—formed during the precipitation process. The washed filter cake is then dried and calcined. For making a catalyst containing potassium oxide and iron oxide, a mixture of the required amounts of potassium carbonate and unhydrated iron oxide are dry-blended with a small amount of organic lubricant. Water is then added into the oxide mixture to form an extrudable paste which is then formed in cylindrical pellets, dried and calcined at about 600° C.

Supported iron catalysts are usually prepared by impregnating a solution of an iron salt onto a refractory metal oxide such as $Al_2O_3$, $SiO_2$, $TiO_2$ or $ZrO_2$. The impregnation can be carried out by incipient wetness techniques or by excess wetting followed by vacuum drying. Supported iron catalysts can have STYRENE activity similar to precipitated iron catalysts on an iron mass basis, but they are typically inferior on a catalyst volume basis and they inevitably suffer from the acidity of the metal oxide supports which increases the selectivity of undesirable methane.

Thus, it would be advantageous to have a method to produce a STYRENE catalyst starting from an iron oxide that has a relatively simple to manufacture, that requires little to no washing steps, that has a relatively low product cost, and that does not generate by-products are deleterious to the environment.

SUMMARY OF THE PRESENT INVENTION

A STYRENE catalyst comprising iron and at least one promoter is prepared via a method which comprises the preparation of a high purity iron oxide from iron metal. The catalyst particles prepared with the high purity iron oxide are essentially free of contaminants, particularly halogens, nitrogen and sulfurs, and surface areas of up to about 100 m²/g—suitable for various catalyst applications.

The method comprises reacting iron metal with a mild organic acid and air in the presence of a minimal amount of water. The amount of water consumption in this invention is significantly less than that used in a conventional precipitation method and as a result, minimum or no waste water containing sulfate, nitrate or chloride is generated in this process. The slurry is spray dried to form the pure iron oxide. The iron oxide is then compounded with the promoters such as the salt or oxide of one or more of the following: cerium, titanium, molybdenum, tungsten, chromium, aluminum, silicon, zinc, manganese, cobalt, cadmium, vanadium and copper, alone or in combination to form cylindrical pellets. The pellet is calcined to form the final catalyst. Because the process uses iron metal, the level of potential contaminants, such as sulfur and chlorine, can be kept to a minimum by starting with clean metal. Further, by starting with iron metal, there are no residual materials which need to be removed by washing the iron oxide filtrate so the amount of waste water is reduced.

DETAILED DESCRIPTION OF THE PREFERRED EMBODIMENTS

The catalyst of the present invention is intended for use in the ethylbenzene dehydrogenation or "STYRENE" process. The catalyst composition is similar to STYRENE catalysts of the prior art and, in particular, to the STYRENE catalysts described in U.S. patent application Ser. No. 20010020118, and comprises iron and at least one promoter. However, the process by which the iron oxide is prepared is novel and the catalyst of the present invention includes fewer contaminants, such as sulfur and chlorine, and can be produced more efficiently than the prior art STYRENE catalysts.

As is further known in the art, the physical structure of the STYRENE catalyst can affect the catalyst activity and selecting the proper catalyst design for a particular type of reactor can translate to relatively high production rates and relatively low maintenance costs for a commercial producer. The catalyst's structural or mechanical properties, including pore volume distribution, pellet crush strength and attrition resistance, affect usable catalyst life in the reactor, and ultimately impact the process economics. The catalyst pellet's shape and size also can affect properties such as flow distribution and pressure drop. The process by which the iron oxide of the present invention is prepared results in a catalyst that has a desirable surface area and pore structure.

Broadly presented, the process for preparing a preferred embodiment of the catalyst of the present invention includes directly treating iron metal with a mild organic acid and air to form an iron oxide slurry, then intensively milling the slurry to a small micron size, and then spray drying the slurry with a wheel atomizer. Water is added to the process only as needed to allow for mixing of the materials. (As used herein, the term "contaminants" refers to elements or compounds which are known in the art to deleteriously affect the environment and adversely affect the performance of the STYRENE catalyst and process. Some commonly recognized contaminants are sulfur and chlorine.) More specifically, to prepare the STYRENE catalyst of the present invention, iron metal is reacted with a mild organic acid in aqueous media at ambient conditions, and the mixture is then aerated. The iron metal may be a powder, granule, sphere, chip or other form having an average diameter of from about 1μ to about 500μ. In one embodiment, the iron metal is in micro-spheroidal form with an average diameter of from about 40μ to about 150μ. Further, the iron metal should be essentially contaminant-free, although traces of carbon, manganese, nickel, copper, silicon and combinations thereof, may be present. (As used herein, "traces" is defined as less than about 1.5 wt % for all the elements combined.) The organic acid is preferably a carboxylic acid having at least one carboxylic acid group with a $pK_a$ at ambient temperature of from about 0.5 to about 6. For example, formic acid, acetic acid, glycolic acid, oxalic acid, pyruvic acid, malonic acid, citric acid and propionic acid may be used in the reaction.

The organic acid is added to deionized water with agitation to form an acid solution. At ambient temperature and while maintaining the agitation or mixing, the iron metal is slowly added to the acid solution. As the iron reacts with the acid, the reaction temperature increases, but the rate of addition should be sufficiently slow that the temperature does not exceed about 200° F. It is believed that when iron metal is added to the organic acid solution, the iron is oxidized by the acid and hydrogen gas ($H_2$) is produced. The hydrogen gas can be diluted in a vent with air to a concentration of less than about 4%, i.e. below the explosion limit, or it can be sent to an after-burner to recover the heat for use in drying or calcination.

After the iron metal is mixed into the acid solution, an additional oxidizing agent, such as air, compressed air, oxygen, hydrogen peroxide, an organic peroxide, ozone or a combination thereof, is added to the solution. In one embodiment the oxidizing agent is compressed air which is forced through the solution via a stainless steel air sparger mounted within a mix tank, however, a variety of other means as are known in the art may be used to bubble air through the iron/acid solution. The air flow is continued and the reaction temperature is held at less than about 200° F. until essentially all the free iron is consumed and an iron slurry is formed. The slurry is believed to comprise iron oxide hydrate, iron oxide, iron hydroxide, iron oxyhydroxide or a combination thereof. Total iron consumption time can range from about 24 hours to about 48 hours, or longer depending on the iron source. During the course of the reaction, the slurry color changes from gray to brown. Typically, the color change will be evident from about 45 minutes to about 6 hours after the air flow is started. Unreacted iron can be detected by X-ray diffraction patterns.

The slurry is then spray dried with a wheel atomizer. The inlet temperature is set to about 500° F., and the outlet temperature is maintained at about 300° F. After spray drying, the surface area of the iron oxide is from about 2 m²/g to about 40 m²/g. After calcining in a box furnace set at about 1200° F. for about 4 hours, the iron oxide has a surface area of from about 2 m²/g to about 80 m²/g. The spray dried iron oxide has an essentially spherical shape.

The iron oxide powder is then mixed with several promoters chosen from cerium, titanium, molybdenum, tungsten, chromium, aluminum, silicon, zinc, manganese, cobalt, cadmium, vanadium and copper, and combinations thereof. The STYRENE catalyst pellets are then formed by pressure forming and calcination.

Pressure forming by tabletting, pelletizing or extruding is used most frequently in industrial catalyst production. Formation of the STYRENE catalyst typically uses a pellet press (or called pellet mill, or pelletizer) operating at relative lower pressure then a tabletting machine. Pellets are agglomerated by forcing then through orifices of the die by a rotating (gear) or rolling (roller) element. Similar to the tabletting machine operation, the material is densified, deformed and pressed into large particles. Lubrication is critical for adequate friction between surfaces of catalyst and die. As is known in the art, polymers such as methylcellulose, hydroxypropyl methylcellulose and/or the other cellulose ethers are often used as the lubricant. The melting point of the polymer chosen should be slightly higher than maximum temperature in the chamber of the press.

During the forming process, iron oxide powder is continuously fed into the die from a feeder and pellets are continuously ejected from the die. Fluidity of the catalyst powder aids in forming strong pellets. If the powder lacks the required fluidity and lubricity, two measures are usually taken—powder densification by an additional kneading step and/or addition of lubricating material such as graphite, paraffin oil, clay, talc, stearic acid or metal stearate. Forming conditions affect the total pore volume and shape of pores of the final catalyst. The formed catalyst is calcined to eliminate lubricant, create desirable pore structure and surface area.

The resultant catalyst can be used for the dehydrogenation of ethylbenzene to styrene, and comprises from about 20 wt % to about 90 wt % iron oxide calculated as $Fe_2O_3$, from about 5 wt % to about 20 wt % of an alkali metal compound calculated as an alkali metal oxide, from about 0.1 ppm to about 1,000 ppm of a source of palladium or platinum selected from the group including elemental palladium, elemental platinum, compounds containing palladium, compounds containing platinum and combinations thereof, from about 0.5 wt % to about 10.0 wt % of a molybdenum or tungsten compound calculated as $MoO_3$ or $WO_3$, and from about 4.0 wt % to about 20 wt % of a cerium compound, calculated as $CeO_2$, wherein all weight percents are based on the total weight of the catalyst. Optionally, the catalyst may further comprise from about 0.05 wt % to about 10.0 wt % of an oxide of aluminum, silicon, manganese, copper, zinc, cadmium, vanadium, and cobalt, calculated on an elemental basis. While the catalyst of the present invention has a composition similar to prior art STYRENE catalysts but is prepared with less water, generating less waste water, and is essentially free from contaminants. It is understood that the composition of the catalyst and the specific processing conditions may be varied without exceeding the scope of this development.

We therefore claim:

1. A method of making a catalyst for use in the dehydrogenation of ethylbenzene to styrene, said catalyst comprising from about 20 wt % to about 90 wt % iron oxide calculated as $Fe_2O_3$, from about 5 wt % to about 20 wt % of an alkali metal compound calculated as an alkali metal oxide, from about 0.1 ppm to about 1,000 ppm of a source of palladium or platinum selected from the group consisting of elemental palladium, elemental platinum, compounds containing palladium, compounds containing platinum and combinations thereof, from about 0.5 wt % to about 10.0 wt % of a molybdenum compound or tungsten compound or a combination thereof, calculated as $MoO_3$ or $WO_3$, and from about 4.0 wt % to about 20 wt % of a cerium compound, calculated as $CeO_2$, wherein all weight percents are based on the total weight of the catalyst, and said method comprising:

a) preparing an aqueous organic acid solution, wherein said organic acid is a carboxylic acid having at least one carboxylic acid group with a $pK_a$ at ambient temperature of from about 0.5 to about 6;

b) adding iron metal to said acid solution;

c) forcing an oxidizing agent through said acid solution until said iron metal is consumed and an iron slurry is formed;

d) spray drying said iron slurry with a wheel atomizer to form iron oxide having a surface area of from about 2 $m^2/g$ to about 40 $m^2/g$;

e) calcining said iron oxide at a temperature of about 1200° F. until the calcined iron oxide has a surface area of from about 2 $m^2/g$ to about 80 $m^2/g$;

f) mixing the iron oxide with said alkali metal compound, and with said palladium or platinum, and with said molybdenum compound or tungsten compound or combination of molybdenum and tungsten compounds, and with said cerium compound, and optionally, with a promoter to form a mixture;

g) forming said mixture into catalyst pellets by pressure forming; and h) calcining said catalyst pellets to form said catalyst.

2. The method of claim 1 wherein said organic acid is selected from the group consisting of formic acid, acetic acid, glycolic acid, oxalic acid, pyruvic acid, malonic acid, citric acid, propionic acid, and combinations thereof.

3. The method of claim 1 wherein said iron metal is a powder, granule, sphere, chip or other form having an average diameter of from about 1μ to about 500μ.

4. The method of claim 1 wherein said promoter comprises a metal selected from the group consisting of titanium, chromium, aluminum, silicon, zinc, manganese, cobalt, cadmium, vanadium and copper, and combinations thereof.

5. The method of claim 1 wherein said oxidizing agent is air, compressed air, oxygen, hydrogen peroxide, an organic peroxide, ozone or combinations thereof.

6. The method of claim 1 wherein said catalyst comprises from about 20 wt % to about 90 wt % iron oxide calculated as $Fe_2O_3$, about 5 wt % to about 20 wt % of an alkali metal compound, about 4.0 wt % to about 20 wt % of cerium oxide calculated as $CeO_2$, about 0.5 wt % to about 10.0 wt % of molybdenum or tungsten oxide calculated as $MoO_3$ or $WO_3$, about 0.2 wt % to about 10.0 wt % of calcium or magnesium oxide, about 10 ppm to about 1000 ppm of titanium oxide calculated as $TiO_2$, about 100 ppm to about 2000 ppm of chromium oxide calculated as $Cr_2O_3$, and about 1 ppm to about 1000 ppm of a source for palladium or platinum, calculated on an elemental basis.

7. The method of claim 6 wherein said alkali metal compound is potassium oxide.

8. The method of claim 6 wherein said catalyst further comprises from about 0.05 wt % to about 10.0 wt % of an oxide of aluminum, silicon, manganese, copper, zinc, cadmium, vanadium, or cobalt, calculated on an elemental basis.

9. A method of making a catalyst for use in the dehydrogenation of ethylbenzene to styrene, said catalyst comprising a high purity iron and a promoter, and said method comprising:

a) preparing an aqueous organic acid solution, wherein said organic acid is a carboxylic acid having at least one carboxylic acid group with a $pK_a$ at ambient temperature of from about 0.5 to about 6;

b) adding high purity iron metal to said acid solution, wherein said iron metal is a powder, granule, sphere, chip or other form having air average diameter of from about 1μ to about 500μ;

c) forcing an oxidizing agent selected from the group consisting of air, compressed air, oxygen, hydrogen peroxide, an organic peroxide, ozone or combinations thereof, through said acid solution until said iron metal is consumed and an iron slurry is formed;

d) spray drying said iron slurry with a wheel atomizer to form iron oxide having a surface area of from about 2 $m^2/g$ to about 40 $m^2/g$;

e) calcining said iron oxide at a temperature of about 1200° F. until the calcined iron oxide has a surface area of from about 2 $m^2/g$ to about 80 $m^2/g$;

f) mixing the iron oxide with said promoter to form a mixture;

g) forming said mixture into a catalyst pellets by pressure forming; and h) calcining said catalyst pellets to form said catalyst.

10. The method of claim 9 wherein said organic acid is selected from the group consisting of formic acid, acetic acid, glycolic acid, oxalic acid, pyruvic acid, malonic acid, citric acid, propionic acid, and combinations thereof.

11. The method of claim 9 wherein said promoter is selected from the group consisting of cerium, titanium, molybdenum, tungsten, chromium, aluminum, silicon, zinc, manganese, cobalt, cadmium, vanadium and copper, an alkali metal compound, a palladium source, a platinum source, elemental palladium, elemental platinum, compounds containing palladium, compounds containing platinum, a molybdenum compound, a tungsten compound, a cerium compound, and combinations thereof.

12. The method of claim 11 wherein said catalyst comprises from about 20 wt % to about 90 wt % iron oxide calculated as $Fe_2O_3$, from about 5 wt % to about 20 wt % of an alkali metal compound calculated as an alkali metal oxide, from about 0.1 ppm to about 1,000 ppm of a source of palladium or platinum selected from the group consisting of elemental palladium, elemental platinum, compounds containing palladium, compounds containing platinum and combinations thereof, from about 0.5 wt % to about 10.0 wt % of a molybdenum or tungsten compound calculated as $MoO_3$ or $WO_3$, and from about 4.0 wt % to about 20 wt % of a cerium compound, calculated as $CeO_2$, wherein all weight percents are based on the total weight of the catalyst.

* * * * *